United States Patent [19]

Foley et al.

[11] 4,332,046

[45] Jun. 1, 1982

[54] COMBINED HAMMER AND LEVEL

[76] Inventors: Clifford T. Foley, 22131 NE. Garner Rd., Yacolt, Wash. 98675; Carl W. Brandenfels, P.O. Box 1208, St. Helens, Oreg. 97051

[21] Appl. No.: 176,667

[22] Filed: Aug. 11, 1980

Related U.S. Application Data

[63] Continuation-in-part of Ser. No. 45,785, Jun. 5, 1979, abandoned.

[51] Int. Cl.³ .............................................. B25F 1/00
[52] U.S. Cl. ........................................ 7/146; 7/164; 33/334; D8/81; D8/105
[58] Field of Search ......................... 7/164, 143, 146; 33/334, 375, 333; 145/61 R; D8/81, 105, 107

[56] References Cited

U.S. PATENT DOCUMENTS

| 1,490,220 | 4/1924 | Lawrence | 33/334 |
| 1,702,689 | 2/1929 | Duemler | 33/334 |
| 2,976,046 | 3/1961 | McCullough | 33/334 |
| 3,119,424 | 1/1964 | Henry | 7/164 |
| 3,816,864 | 6/1974 | Cotter | 33/334 |

FOREIGN PATENT DOCUMENTS 560888 7/1958 Canada .................................... 7/146

Primary Examiner—Roscoe V. Parker
Attorney, Agent, or Firm—Eugene M. Eckelman

[57] ABSTRACT

The handle of a hammer has a recess at the free end and one or more spirit levels are embedded in a plastic filler in the recess. The spirit levels are associated with surface engaging points on the hammer, comprising points on the striking head portion of the hammer or on a side of the head in combination with a bottom or side point at the free end of the handle. Spirit levels, including a bullseye level, are provided to accomplish horizontal leveling in two directions and also in a vertical direction. The bottom surface of the recess is painted a contrasting color for easy viewing of the spirit levels, and interengaging tongues and recess extensions are provided for locking the plastic filler in its recess.

5 Claims, 7 Drawing Figures

COMBINED HAMMER AND LEVEL

CROSS REFERENCE TO RELATED APPLICATION

This application is a continuation-in-part of application Ser. No. 045,785 filed June, 5, 1979, and now abandoned by Clifford T. Foley for COMBINED HAMMER AND LEVEL.

BACKGROUND OF THE INVENTION

This invention relates to new and useful improvements in a combined hammer and spirit levels.

Leveling devices are necessary in the making of buildings or other construction work, and it is common practice for carpenters or other workman to employ a leveling tool using spirit levels. In the use of such tool, it must be picked up and laid down many times during construction which of course is bothersome to the carpenter and also time consuming.

Means have heretofore been proposed for placing a level on a hammer handle so as to avoid the inconvenience of using a level as a separate tool. A combined hammer construction of applicants' knowledge that employs leveling means therewith is not satisfactory first in that the leveling means is improperly placed on the hammer whereby it may be damaged by the shock of hammering operations and may also be damaged from exterior forces or knocked out of adjustment. Such prior device may also interfere with the grip and use of the hammer. In addition, such prior device is complex in construction and is not convenient to use, whereby the use of a hammer and leveling device as separate tools has still been the best procedure.

SUMMARY OF THE INVENTION

According to the present invention and forming a primary objective thereof, a combined hammer and level is provided which has the level mounted in the handle of the hammer in a selected manner so as not to be damaged as a result of blows of the hammer, which is simplified and inexpensive to manufacture, which does not interfere with the grip on the handle or use of the hammer, which cannot be damaged or knocked out of adjustment, and which employs a novel arrangement of spirit levels for determining the plane of surfaces relative to the horizontal and to the vertical.

In carrying out these objectives, the hammer handle is provided with recess means at the free end thereof, and such recess means contains a pair of spirit levels aligned with surface engaging points on the hammer for properly determining the plane of surfaces relative to the horizontal and to the vertical. Said surface engaging points may comprise the striking surface or a side of the head of the hammer and a point at the free end of the handle. The recess means has a clear plastic filler therein which embeds and protects the levels and which is flush with the surrounding surface of the handle so as to comprise a grip portion for the handle. The bottom of the recess means is colored, preferably by fluorescent paint, for contrasting the appearance of the spirit levels and for viewing in the dark, and said recess means and the plastic filler have interengaging torques and recess extensions for locking the filler in the recess means. A bullseye level is also combined with the pair of spirit levels for use with the latter in determining a level in two planes.

The invention will be better understood and additional objects and advantages will become apparent from the following description taken in connection with the accompanying drawings.

DETAILED DESCRIPTION OF A PREFERRED EMBODIMENT

Figure 1:
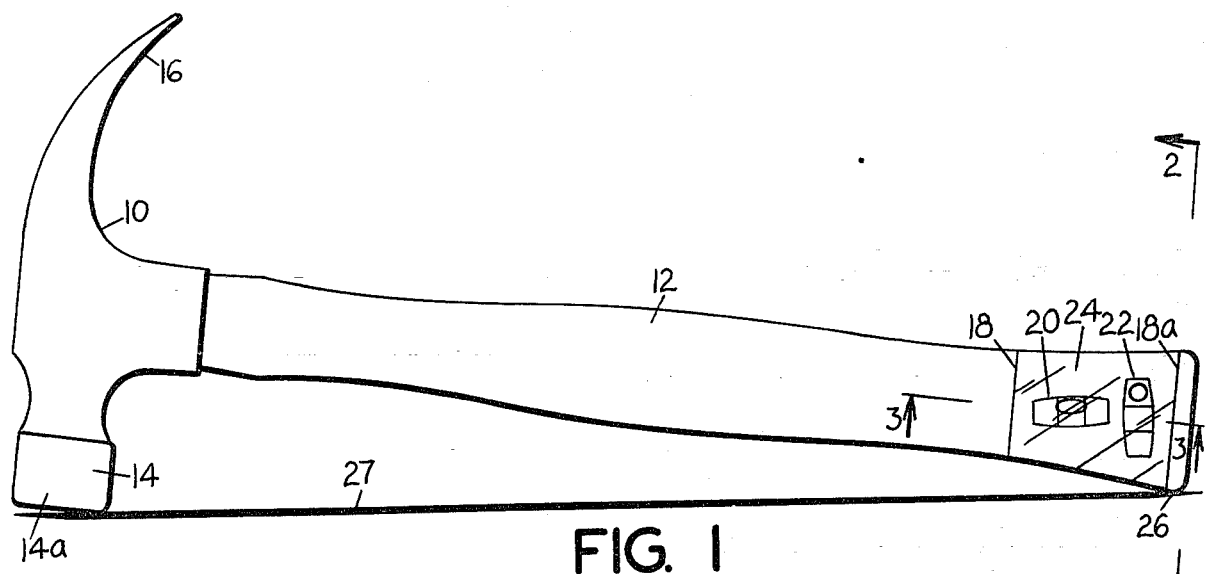
FIG. 1 is an elevational view of the present hammer, the hammer being shown in one of its leveling positions.
Figure 3:
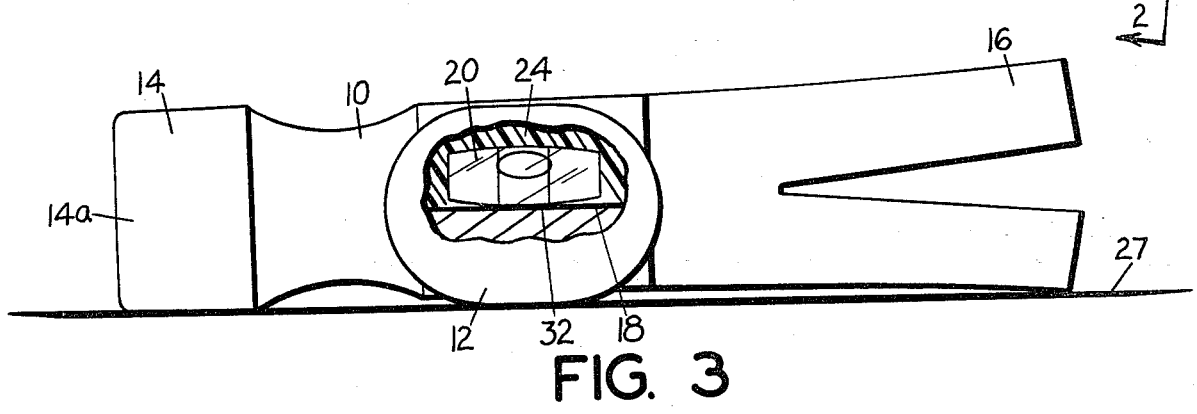
FIG. 3 is an enlarged end elevational view taken on the line 3—3 of FIG. 1 and partly broken away.
Figure 4:
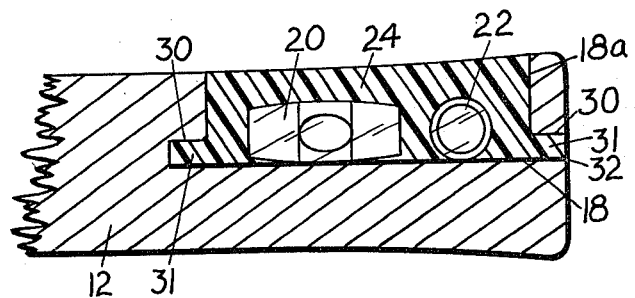
FIG. 4 is an enlarged fragmentary sectional view taken on the line 4—4 of FIG. 1.

With particular reference to the drawings, and first to FIGS. 1-4, the numeral 10 designates the head of a conventional hammer and the numeral 12 designates, except for leveling means to be described, a conventional handle. The head 10 includes an extension 14 having a striking surface 14a. The head may have claw portions 16 or other means according to the type of hammer.

According to the present invention, one side of the handle adjacent its free end has a recess 18 which for purposes of the invention has its rearward defining wall 18a spaced only a short distance from the end of the handle. Although the exact depth of the recess can vary, it is preferred that it be sufficiently deep for the intended purpose and at the same time be sufficiently shallow so as not to weaken this end portion of the handle. A depth of about one-half the thickness of the handle has been found to be a good depth.

Contained in the recess 18 are spirit levels 20 and 22 of the usual type employing a tube containing a liquid with a bubble in it and having centering lines for alignment of the bubble in leveling functions. The spirit levels 20 and 22 are embedded in a clear, tough plastic filler 24 such as a transparent polyester casting resin which fills the recess. The levels are clearly viewable through the filler.

The leveling means are located in the plastic in conjunction with leveling points on the hammer so that the hammer is arranged to be used in determining the plane of surfaces. In this regard, the level 20 is installed so that its bubble will be centered when the striking surface 14a of the hammer and a point 26, FIG. 1, at the free end of the hammer on the same side as the striking surface 14a, namely, on the bottom side, are horizontally aligned. Thus, to determine the plane of a surface with the level 20, the hammer is placed on such surface with the points 14a and 26 in engagement therewith. This function is shown in FIG. 1 wherein the reference numeral 27 designates a surface to be tested. The hammer can be placed on top of a surface for leveling as shown or of course it can be placed up against the bottom of a surface by using the same two contact points 14a and 26.

The spirit level 22 is disposed at right angles to the line extending between engaging points 14a and 26 and thus is used for testing a vertical surface by use of such two engaging points.

Figure 2:
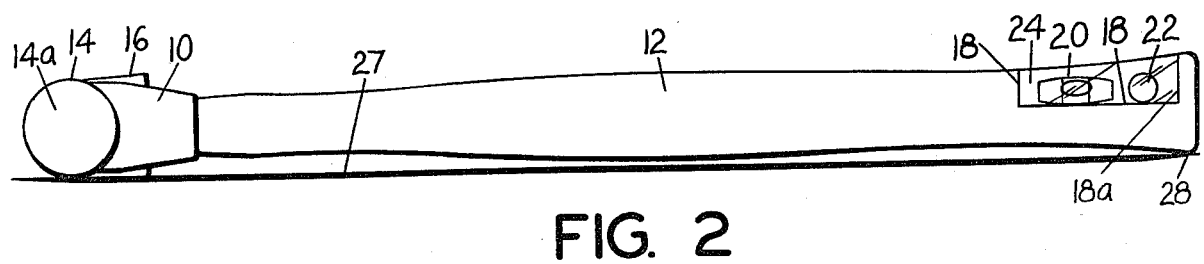
FIG. 2 is also an elevational view of the hammer but this view shows the hammer in another of its leveling positions.

In addition to the striking surface 14a of the hammer head and the point 26 on the handle comprising leveling points, a side portion or edge of the head on the side of the hammer opposite from the recess 18 can also serve as a leveling point. This leveling position is shown in FIG. 2. In this latter case, the side of the head is used in combination with a leveling point 28 at the free end of the handle. The level 20 is also selectively located so that its bubble is centered when the side of the hammer head which is opposite from the recess and the handle point 28 are horizontally aligned. The level 22 thus must be in the same lateral plane as the level 20, and by such positioning in combination with level 20, leveling can be accomplished simultaneously in a direction longitudinally of the hammer and also in a direction laterally of the hammer. The particular mounting of the two level means thus allows the hammer to determine the plane of both horizontal or vertical surfaces and also to level in two directions simultaneously relative to the horizontal. Since the two level means are in the same recess and closely adjacent, readings therefrom are conveniently made for the two planes.

The plastic filler 24 is securely held in the recess by forward and rearward recess extensions 30 provided in the handle which receive tongue portions 31 of the filler. The rearward extension 30 opens through the rear surface of the handle whereby with the rearward end of the hammer in a mold, filler 24 can be poured in the recess extension 30. The positive mounting of the filler prevents the leveling means from being dislodged or getting out of adjustment.

It is preferred that the bottom of the recess 18, and also the front and defining edges thereof if desired, be provided with a suitable colored coating, such as yellow, designated by the numeral 32, to provide clear viewing of the spirit levels. Such coating can be fluorescent paint if desired for making the levels visible in the dark.

In the construction of the leveling means from a wood handle for example, the handle is first cut with the recess 18 as well as the extensions 30 thereof. The recess is then provided with the contrasting paint 32 and thereupon the spirit levels 20 and 22 are glued in their proper positions. For precision in leveling and for efficiency in manufacture, the recess 18 has a precisely flat bottom surface and one made precisely parallel with a line extending between point 28 and the engaging side surface of the hammer head and also precisely parallel with the lateral engaging points on the head. The levels 20 and 22 can thus be glued initially in place by directly seating them on such bottom surface and their relation to the hammer engaging points will not vary. After properly anchoring the levels in place, the plastic filler 24 is installed, it being preferred that the end of the handle be disposed in a confining mold and the filler in liquid form poured through the rearwardmost recess extension 30 so that it will flow into the front recess extension 30 and fill the recess 18 around the spirit levels. After the plastic has set, it can be buffed if necessary and otherwise finished. Such process of construction provides easy formation and also is an efficient way of installing the filler 24.

Figure 5:
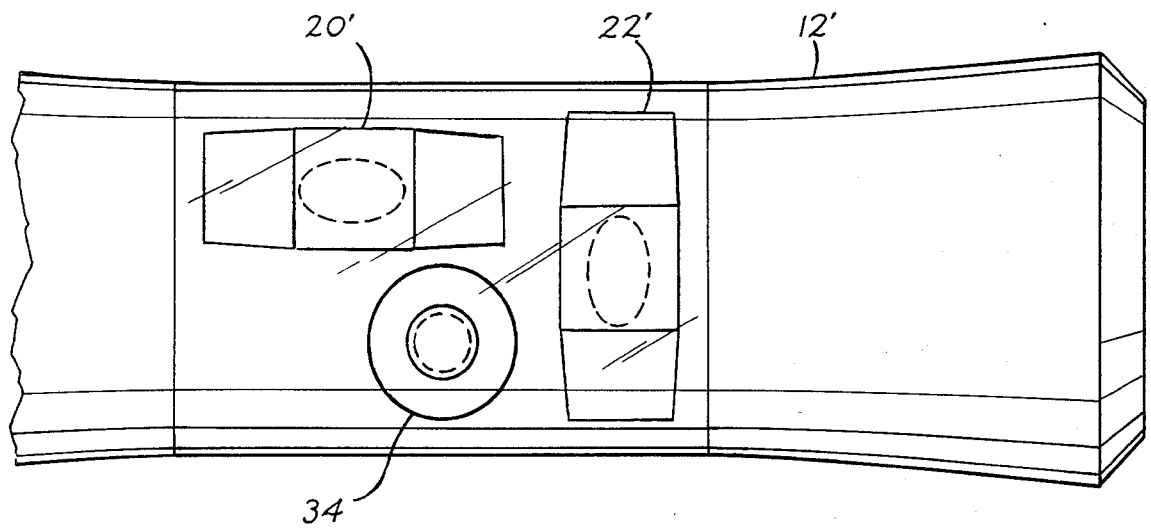
FIG. 5 is an enlarged fragmentary elevational view showing a modified arrangement of levels, namely, the addition of a bullseye level.
Figure 6:
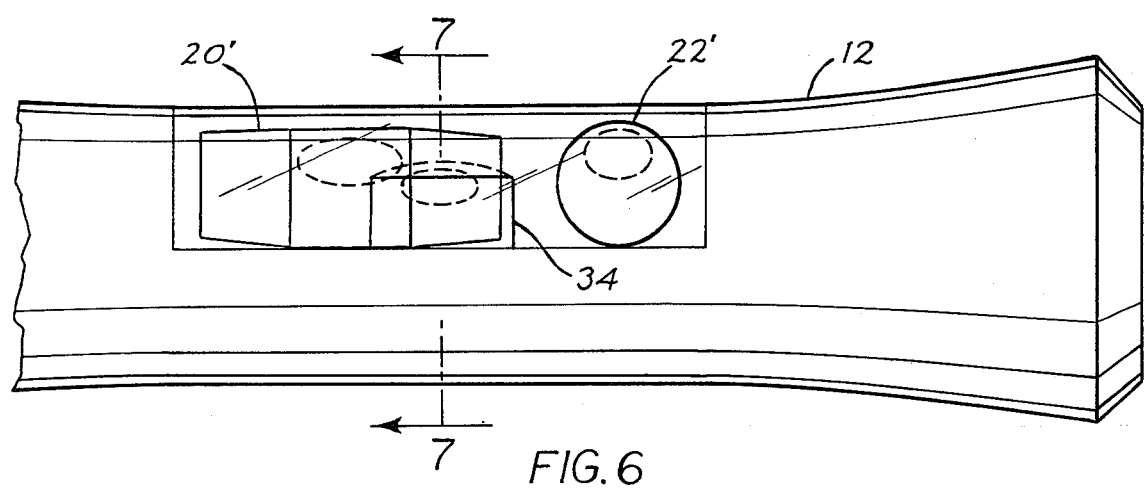
FIG. 6 is also an elevational view of the hammer of FIG. 5, this view being taken from a position similar to FIG. 2.
Figure 7:
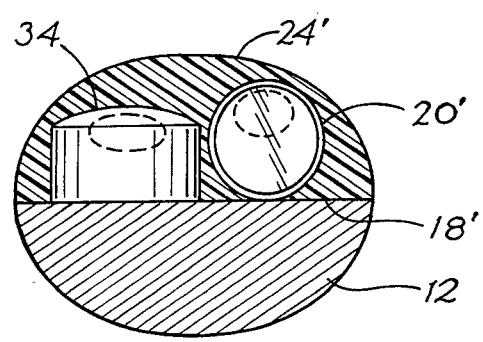
FIG. 7 is a sectional view taken on the line 7—7 of FIG. 6.

With reference to FIGS. 5, 6, and 7, a bullseye level 34 can also be embedded in the plastic 24' in a hammer handle 12'. It is installed flat on the bottom wall 18' and in such position its bubble will be centered when the hammer is laid flat as in FIG. 2 on a surface that is level in both longitudinal and lateral directions relative to the hammer. Level 34 is combined in use with levels 20' and 22' in that it gives an easy to read rough level check so that the operator knows at a quick glance the precise direction at which leveling should occur. The levels 20' and 22' can then be combined with the level 34 to complete the leveling function. Level 34 also can then be used by itself to achieve a final fine leveling. The combination of the three levels thus provides a fast and convenient initial level check and a fast and convenient final level check.

The invention thus provides a combined hammer and level having a first advantage that the level will not be damaged by blows of the hammer. This is because of the rearward location of the leveling means wherein the primary shock from the hammer blows is absorbed by the carpenter's hand. The embedding of the levels within a tough and durable plastic and the method of attaching the plastic to the handle provides a substantially damage free leveling means and a positive mount in the handle which will insure permanent placement of the levels not capable of getting out of adjustment. The leveling means by its inherent structure is likewise simplified and inexpensive to manufacture and since the plastic filler is flush with the surface of the hammer, it will not interfere with use of the hammer.

It is to be understood that the forms of our invention herein shown and described are to be taken as preferred examples of the same and that various changes in the shape, size and arrangement of parts may be resorted to without departing from the spirit of our invention, or the scope of the subjoined claims. For example, the concept of the invention can be used with any type of pounding tool such as roofing hammers, ball peen hammers, hatchets, etc.

Having thus described our invention, we claim:
1. A hammer construction comprising
    (a) a head having a striking surface and side surfaces,
    (b) a handle having opposite end portions one of which is secured to said head and the other of which comprises a hand grip end,
    (c) a recess in said hand grip end of said handle having a bottom wall,
    (d) a pair of spirit levels supported on said bottom wall of said recess disposed at right angles to each other for determining the plane of surfaces in a direction longitudinally of said bottom wall and also in a direction laterally of said bottom wall,
    (e) a bullseye level also supported on said bottom wall for determining the plane of a surface in directions longitudinally and laterally of said bottom wall as well as all directions therebetween,
    (f) and a transparent plastic filler securely embedding all of said level means,
    (g) said plastic filler being flush with the surrounding surface of said handle whereby said plastic filler serves as a grip portion of said handle,
    (h) said pair of spirit levels and said bullseye level being secured in place in said filler on said bottom wall,
    (i) said hammer having surface engaging points specifically related to the plane of said recess bottom wall whereby upon engaging said surface engaging points on a surface, the plane of a surface can be determined in said longitudinal and lateral directions and all directions therebetween.

2. The hammer construction of claim 1 wherein said surface engaging points on said hammer comprise a point on the striking surface of said head and a point of said free end of said handle on the same side of the handle as said striking surface of the head.

3. The hammer construction of claim 1 wherein said surface engaging points on said hammer comprise a side surface of said head and a point of said free end of said handle on the same side of the handle as said head side surface.

4. The hammer construction of claim 1 wherein said recess means includes a colored bottom surface coating for contrasting the appearance of said spirit levels.

5. The hammer construction of claim 4 wherein said colored bottom surface coating comprises a fluorescent coating.

* * * * *